United States Patent Office.

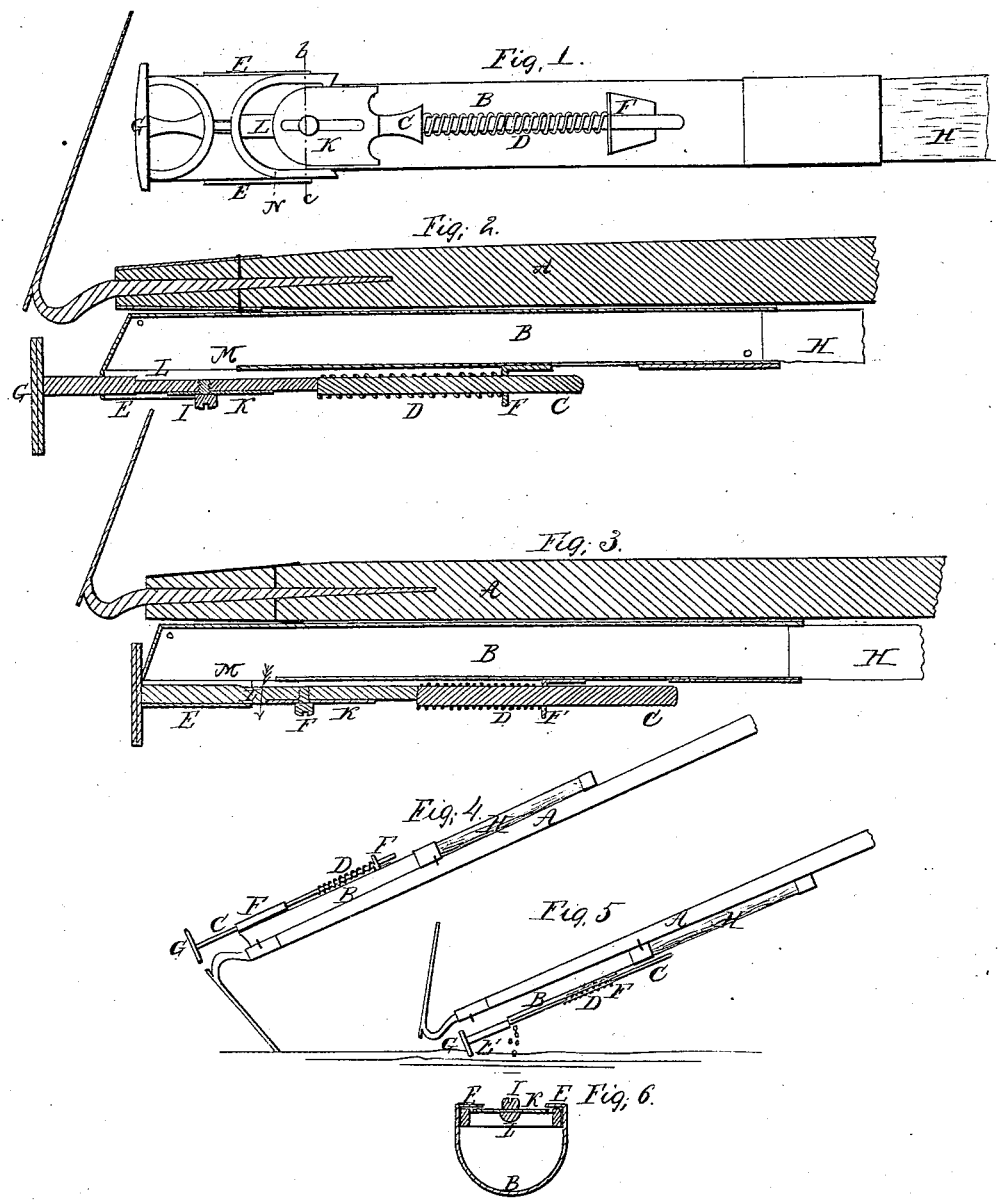

LEWIS WEAVER, OF CANTON, OHIO.

Letters Patent No. 61,490, dated January 22, 1867.

IMPROVEMENT IN HAND CORN-PLANTER.

*The Schedule referred to in these Letters Patent and making part of the same.*

TO ALL WHOM IT MAY CONCERN:

Be it known that I, LEWIS WEAVER, of Canton, in the county of Stark, and State of Ohio, have invented a new and valuable Improvement in Corn-Droppers; and I do hereby declare that the following is a full, clear, and exact description thereof, reference being had to the accompanying drawings, and to the letters of reference marked thereon, of which—

Figure 1 is a plan of corn-dropper.

Figure 2 is a section of same, showing its position with the hand-hoe to which it is attached.

Figure 3 is another section of the same, showing the valve and standard in another position.

Figures 4 and 5, sketches showing the practical operation of the corn-dropper as attached to a hoe.

Figure 6 is a cross-section of the dropper through line $a\,b$ of fig. 1.

The nature of my invention consists in making, in the valve-standard of the corn-dropper, as heretofore constructed, a semi-cylindrical bar, in such a manner that the seeds, in passing out from the dropper to the ground, shall be separated from each other and caused to fall in separate positions in the ground, instead of together, as heretofore, thereby adding greatly to the value of the corn-dropper as an instrument for seeding.

To enable others skilled in the art to make and use my invention, I will proceed to describe its construction and application.

B is the hopper, made of tin or other suitable material. To its upper end is attached the bag H, to increase its capacity. The hopper B and bag H are attached to the back of the handle A of the hoe, as shown in figs. 2 and 3. To the hopper B is attached the valve-standard C, by means of the pieces F and E, which serve as boxes or slides through which the valve-standard moves. The valve-standard C is kept in position by means of the spring D. To the valve-standard C is attached the slotted valve K, by means of the screw I, in a manner as shown, so that, changing the relative position of the valve K and foot G, the quantity of seed may be altered at pleasure. With the valve-standard C in the positions shown in figs. 2 and 4, the valve K is in front of the opening M, and no seed can pass out. When, however, the foot G is pressed on the ground, the valve-standard C and valve K are brought into the position shown in figs. 3 and 5, and the seed passes out, as shown.

My invention consists in putting the bar L, or extending the stem of the valve-standard C, across the opening N, between the lower part of the valve-standard C and the valve K, and making the said bar L of semi-circular form, as shown in fig. 6. It will be readily seen that the seeds, in passing from the opening M in the hopper B, through the opening N to the ground, will be separated by the bar L, and will not be allowed to reach the ground together.

I do not claim as my invention the hopper B, bag H, valve-standard C, spring D, valve K, nor foot G, as these have been used and patented heretofore; but what I do claim as my invention, and desire to secure by Letters Patent, is—

The bar L, in connection with the valve-standard C and opening N, substantially in the manner and for the purpose specified.

LEWIS WEAVER.

Witnesses:
J. ABBOTT,
E. N. BEEBOUT.